United States Patent
Guyomard

(10) Patent No.: US 10,239,192 B2
(45) Date of Patent: Mar. 26, 2019

(54) KEY DEVICE FOR HOLDING A NUT RETAINER

(71) Applicant: ELECTRICITE DE FRANCE, Paris (FR)

(72) Inventor: Christophe Guyomard, Vivy (FR)

(73) Assignee: ELECTRICITE DE FRANCE, Paris (FR)

( * ) Notice: Subject to any disclaimer, the term of this patent is extended or adjusted under 35 U.S.C. 154(b) by 0 days.

(21) Appl. No.: 15/513,950

(22) PCT Filed: Sep. 24, 2015

(86) PCT No.: PCT/EP2015/072036
§ 371 (c)(1),
(2) Date: Mar. 23, 2017

(87) PCT Pub. No.: WO2016/046342
PCT Pub. Date: Mar. 31, 2016

(65) Prior Publication Data
US 2017/0297181 A1 Oct. 19, 2017

(30) Foreign Application Priority Data
Sep. 25, 2014 (FR) .................................... 14 59051

(51) Int. Cl.
*F16B 39/10* (2006.01)
*B25B 23/00* (2006.01)

(52) U.S. Cl.
CPC ........ *B25B 23/0085* (2013.01); *F16B 39/108* (2013.01)

(58) Field of Classification Search
CPC ............................ B25B 23/0085; F16B 39/108
(Continued)

(56) References Cited

U.S. PATENT DOCUMENTS 21,325 A * 8/1858 Dewey .................... B25C 3/008
411/460
90,668 A * 6/1869 Kleeman ................. B25C 3/008
81/44

(Continued)

FOREIGN PATENT DOCUMENTS

DE 2938192 A1 4/1981
FR 1211898 A 3/1960

OTHER PUBLICATIONS

International Search Report with English language translation, dated Dec. 7, 2015, International Application No. PCT/EP2015/072036 (8 Pages).

(Continued)

*Primary Examiner* — Hadi Shakeri
(74) *Attorney, Agent, or Firm* — Womble Bond Dickinson (US) LLP

(57) ABSTRACT

The invention concerns a key device intended to hold a nut retainer in the radial position, when tightening the nut on an associated screw connection, characterized in that it comprises a handle (54) and a head (52) comprising a housing (56) into which a tab of the nut retainer is inserted, said tab being intended to be folded 90° on a body carrying the screw connection, after tightening of the nut, one face (58) of the head having geometry that matches a portion of the body carrying the screw connection that receives the nut, such that the end of the nut retainer, inserted into the head of the key, is held exactly perpendicular to the outer surface of said portion of the body when the nut is tightened.

1 Claim, 5 Drawing Sheets

(58) Field of Classification Search
USPC .................................................. 81/10, 13, 44
See application file for complete search history.

(56) References Cited

U.S. PATENT DOCUMENTS

| | | | | |
|---|---|---|---|---|
| 508,823 | A | * | 11/1893 | Harmon .................. F16B 39/32 411/329 |
| 638,078 | A | * | 11/1899 | Timmons .............. F16B 39/108 411/123 |
| 1,119,807 | A | * | 12/1914 | Carter ..................... B25C 3/008 81/44 |
| 1,294,550 | A | * | 2/1919 | Small et al. .......... F16B 39/108 411/124 |
| 1,477,184 | A | | 12/1923 | Ormsby |
| 1,772,676 | A | * | 8/1930 | Monnier ................. F16B 39/14 411/299 |
| 2,780,811 | A | * | 2/1957 | Rodin ..................... B25C 3/006 81/44 |
| 6,058,759 | A | * | 5/2000 | Wilson .................... B25B 23/00 72/458 |
| 6,352,009 | B1 | * | 3/2002 | Gaidjiergis ............. B25C 3/006 254/25 |
| 2009/0158567 | A1 | | 6/2009 | Fulton et al. |
| 2011/0232428 | A1 | | 9/2011 | Lanfear et al. |

OTHER PUBLICATIONS

French Search Report with English language translation cover sheet, dated Mar. 12, 2015, French Application No. 1459051.
International Search Report with English language translation, dated Dec. 7, 2015, International Application No. PCT/EP2015/072036.

\* cited by examiner

KEY DEVICE FOR HOLDING A NUT RETAINER

BACKGROUND

The present invention relates to the field of devices using nut retainers with stop fins.

Different kinds of nut retainers with stop fins are known.

Four known types of retainers are shown in the appended FIGS. 1 to 4.

Thus a retainer 10a has been shown in FIG. 1, comprising a washer 12 adapted to be engaged on a threaded rod or screwed connection, a radial fin 14 intended to be folded after tightening against the blank of a nut and a tab 16 or elongated fin intended to be folded against a portion of a body bearing the threaded connection associated with the nut. According to FIG. 1, the fin 14 and the tab is 16 are diametrically opposite with respect to the axis of the washer 12.

SUMMARY

Shown in FIG. 2 is a variant embodiment of a retainer 10b according to which the washer 12 is provided with a fin 14 and a diametrically opposed tab 16 and further comprising an additional fin 15 oriented radially at 90 degrees to the fin 14 and to the tab 16.

FIG. 3 shows a variant of a retainer 10c according to which the washer 12 is equipped with a radial fin 15 and a radial tab 16 oriented at 90 degrees to one another.

The retainer variant 10d shown in FIG. 4 simply comprises a washer 12 and a radial tab 16 intended to be folded against the body bearing the screwed connection. In the preferred case, means for limiting the rotation of the washer 12 and the associated nut are provided, friction or notching for example.

FIG. 5 illustrates the use of the aforementioned nut retainers 10. In FIG. 5, a body 20 is observed bearing a screwed connection or threaded rod 22 intended to receive a nut 30.

FIG. 7 shows an axial view of the same means.

As can be seen in FIGS. 5 and 7, once the nut 30 is tightened on the connection 22 to the desired torque, the fin 15 is folded against the blank of the nut 30 and the tab 16 is folded across, i.e. perpendicularly to the median plane of the washer 12 and parallel to the axis of the connection 22, on a blank 21 of the body 20.

The nut 30 is thus immobilized in rotation in principle, at the tightening torque, on the body 20.

According to FIG. 5, the edge 25 on which the tab 16 is folded and which separates the blank 21 and the surface 24 of the body 20 bearing the threaded connection 22, is rectilinear.

According to the variant embodiment shown in FIG. 9, this edge 25 is curved. The functionality, however, remains the same.

The aforementioned nuts with stop fins, implemented according to the modalities shown in FIGS. 5, 7 and 9, have already given good service.

However, as it turns out, when the tab 16 is not correctly positioned with respect to the edge 25, as illustrated in FIG. 6, the nut retainer 10 does not completely carry out its role in that it does not prevent loosening of the nut 30 and consequently does not allow the tightening torque obtained to be maintained with certainty.

By way of illustration, the position occupied by way of an example by the tab 16 in the inclined folded position has been shown in FIG. 8 in solid lines, and in broken lines the position to which the tab is capable of being moved thereafter, as a result of vibrations for example. A person skilled in the art will understand that the transition of the tab from the solid lines position to the broken lines position, illustrated in FIG. 8, leads to loosening of the nut 30.

In this context the present invention has the objective of improving the state of the art by proposing means making it possible to guarantee better operation of the nut retainer, to facilitate their installation and to accelerate tightening operations.

It will be noted that it is particularly important in certain contexts, for example that of intervention in maintenance operations in a nuclear power plant, to proceed rapidly to the correct tightening of the nut on numerous pieces of equipment.

The aforementioned goal is attained according to the invention thanks to a key device intended to hold a nut retainer in the radial position during tightening of the nut on an associated screwed connection, characterized in that it comprises a handle as well as a head including a recess in which is inserted a tab of the nut retainer, which tab is intended to be folded 90° on a body bearing the screwed connection, after tightening of the nut, a face of the head having complementary geometry to a portion of the body bearing the threaded connection which receives the nut, so that the tab of the nut retainer, inserted into the head of the key is held perfectly perpendicular to the outer surface of said portion of the body during tightening of the nut.

BRIEF DESCRIPTION OF THE DRAWINGS

Other features, aims and advantages of the present invention will appear upon reading the detailed description which follows, made by way of non-limiting examples and with reference to the appended drawings wherein:

FIG. 17 shows schematically the key conforming to the invention engaged with a body for positioning a nut retainer, FIG. 18 shows the tightening operation, and FIG. 19 shows the result obtained according to the invention of a nut retainer tab perfectly radial with respect to the outer surface of the body.

DETAILED DESCRIPTION

Nut retainers 10 suitable for use within the scope of the present invention are known per se, conforming for example to the illustrations given in FIGS. 1 to 4, and will therefore not be described in detail hereafter.

As a person skilled in the art knows, such nut retainers are available in different materials and in different dimensions depending on the intended applications.

Figure 1:
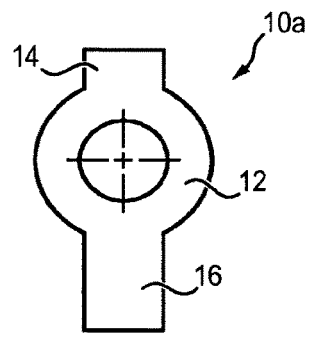
FIGS. 1 to 4 previously described, show schematically 4 variant embodiments of nut retainers with stop fins capable of being used within the scope of the present invention.
Figure 2:
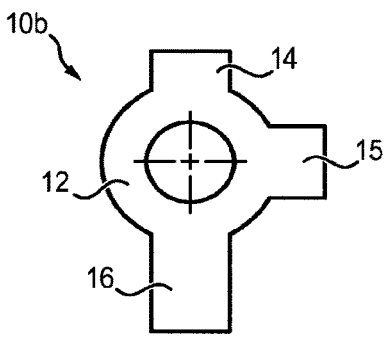
Figure 3:
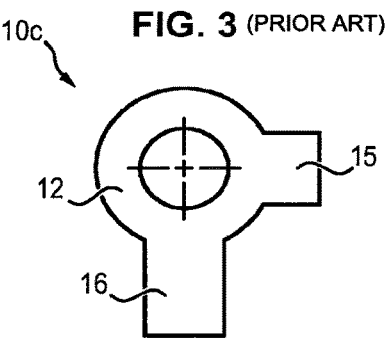
Figure 4:
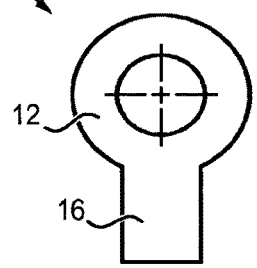
Figure 5:
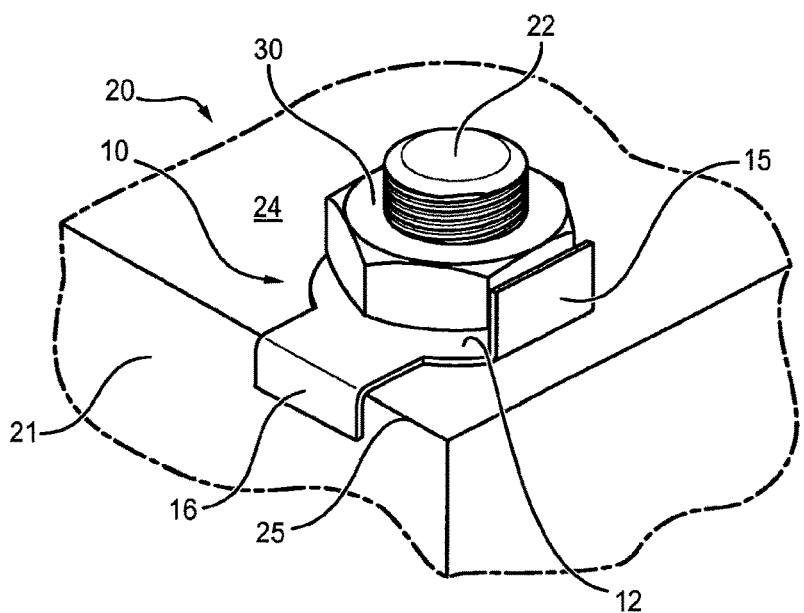
FIG. 5 shows a conventional implementation example of a nut retainer.
Figure 6:
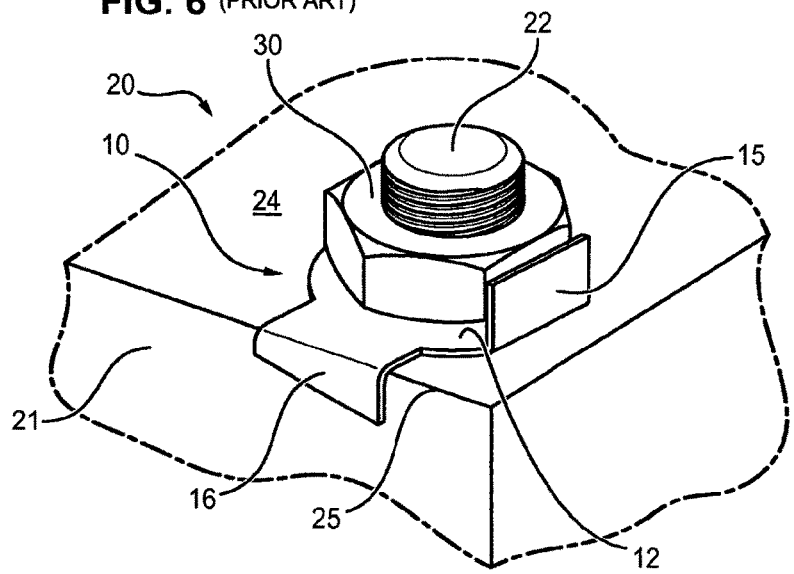
FIG. 6 shows a schematic view of a poor positioning of the nut retainer.
Figure 7:
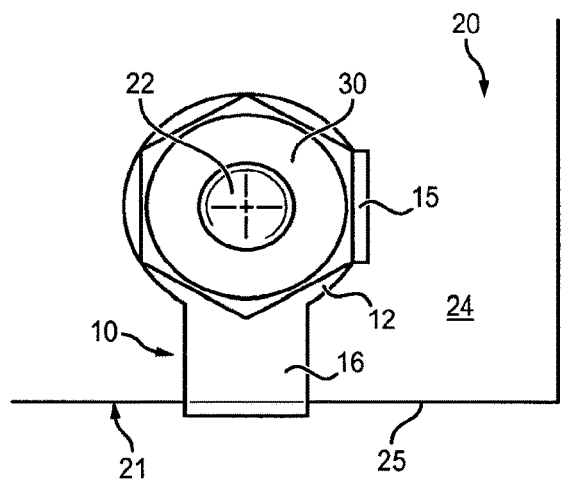
FIG. 7 shows an axial view of the same arrangement.
Figure 8:
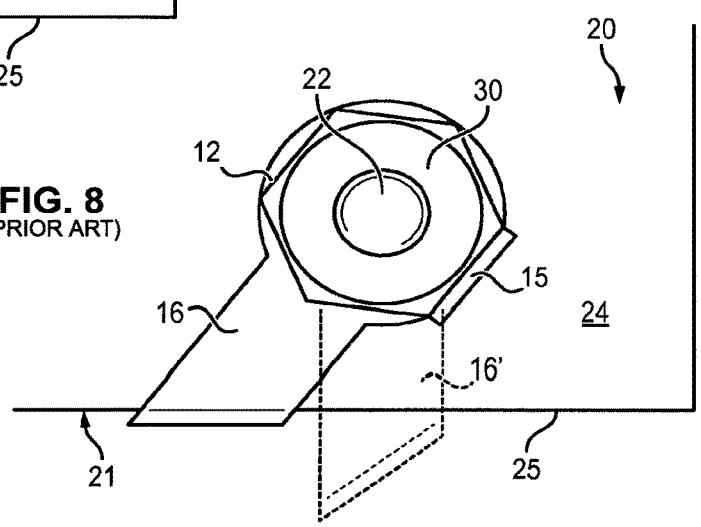
FIG. 8 shows a similar axial view in the case of bad positioning of the nut retainer.
Figure 9:
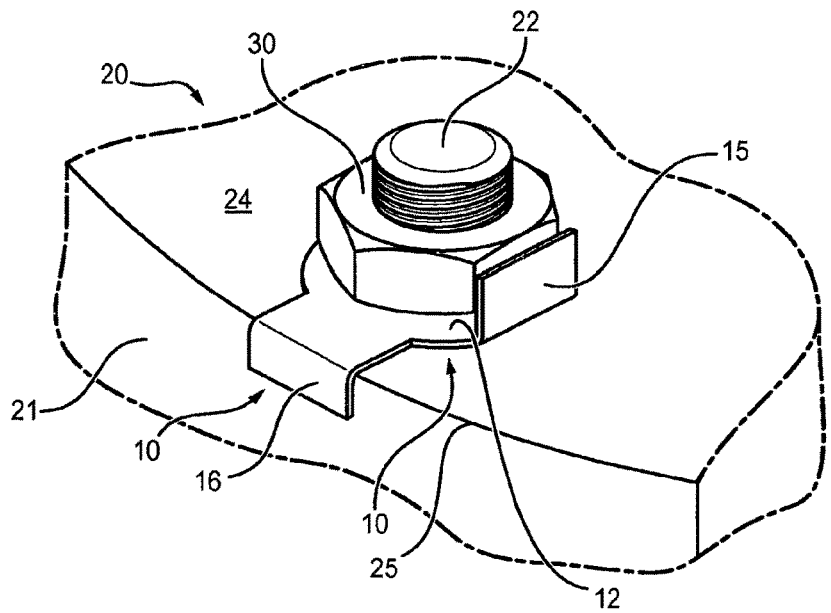
FIG. 9 shows a variant of FIG. 5 with a body having a curved edge on which the tab of a nut retainer is folded.
Figure 10:
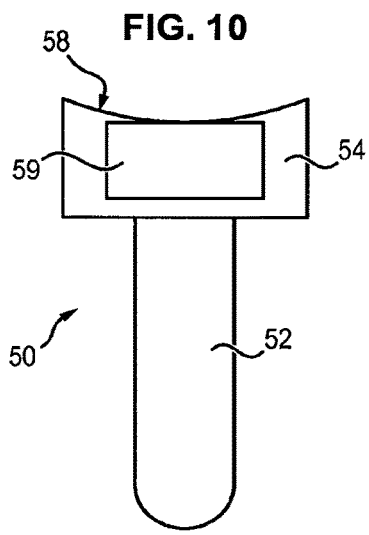
FIG. 10 shows a lateral view of a key conforming to the present invention.
Figure 12:
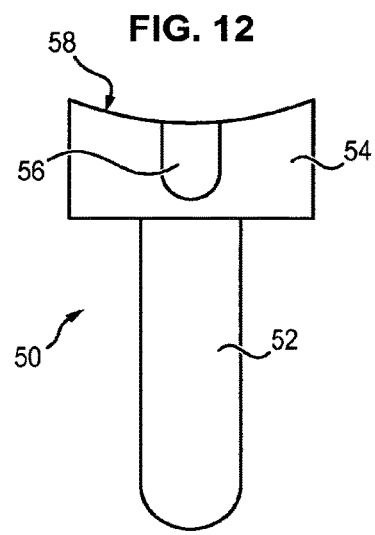
FIG. 12 shows a partial sectional view of the key in the section plane designated XII-XII in FIG. 11, FIGS. 13, 14 and 15 show 3 variant embodiments of keys conforming to the present invention and illustrate together a set of keys capable of being provided to users depending on the dimensions and the nature of the selected nut retainers.
Figure 11:
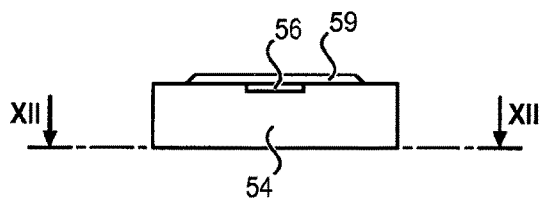
FIG. 11 shows an end view of the same key conforming to the present invention.

As was indicated previously, as illustrated in the appended FIGS. 10, 11 and 12, the invention relates to a key device 50 which comprises a handle 52 which carries a head 54, at one of its ends. The head 54 includes a recess 56. This recess 56 has geometry and dimensions suited for receiving the tab 16 of a nut retainer 10. The face 58 of the head 54 opposite to the handle 52 has a geometry complementary to a portion 21 of the body 20 bearing the threaded connection 22. According to the representation given in appended FIGS. 10 and 12, the aforementioned face 58 is a cylinder of revolution around an axis perpendicular to the main faces of the handle 52. The aforementioned axis is thus preferably parallel to the axis of the threaded connection 22. In other words, the generators which form the face 58 extend parallel to the axis of the threaded connection and thus this face 58 is intended to rest against a face 21 of the body 20 which, for its part, is defined by generators which extend parallel to the axis of the threaded connection. This face 58 is concave cylindrical according to FIGS. 10 and 12.

The recess 56 which leads to the face 58 can be produced by many appropriate means, for example by milling a cavity into the mass of the head 54. According to an advantageous embodiment illustrated in the appended FIGS. 10 to 12, the recess 56 can be simply made by machining a cavity of appropriate dimensions and geometry complementary to the tab 16 on a main face of the head 54, then covering this cavity 56 with an attachment plate 59.

The key 50 is preferably made of metal.

The essentials of its use will now be described with regard to the appended FIGS. 16 to 19.

Figure 16:
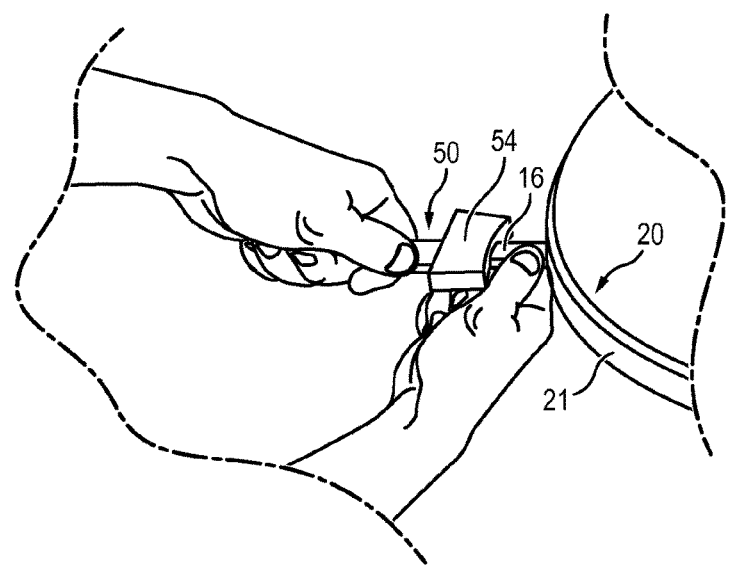
FIGS. 16-19 illustrate 4 successive steps in using the key conforming to the present invention, FIG. 16 showing schematically the blocking in a radial position of a nut retainer by engagement of the tab of this retainer in the recess of a key according to the invention.

First, as illustrated in FIG. 16, a nut retainer is installed on a threaded connection 22 and the tab 16 is oriented generally perpendicular to the outer face 21 of the body 20, then the free end of the tab 16 is engaged in the recess 56.

Figure 17:
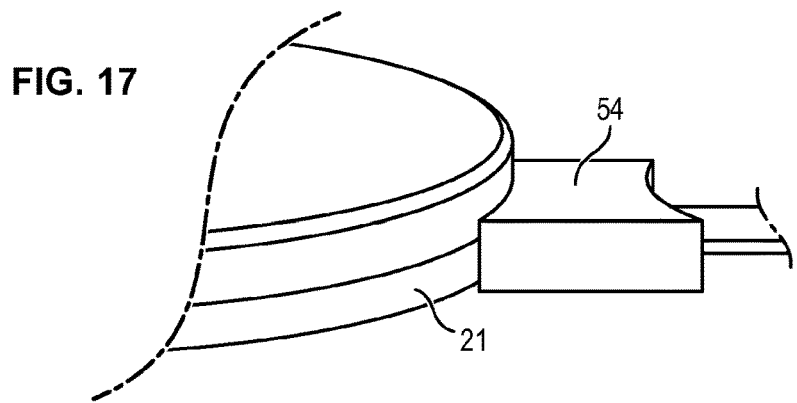

The key 50 is pressed in as illustrated in FIG. 17 to bring its bearing face 58 into contact against the blank 21 of the body 20 bearing the threaded connection on which is engaged the associated nut retainer 10.

Figure 18:
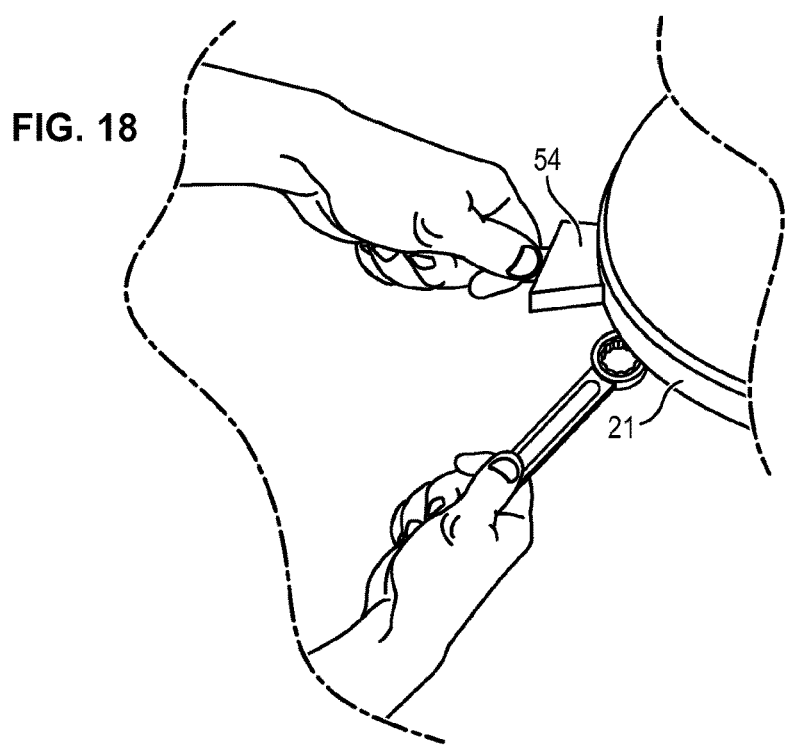
Figure 19:
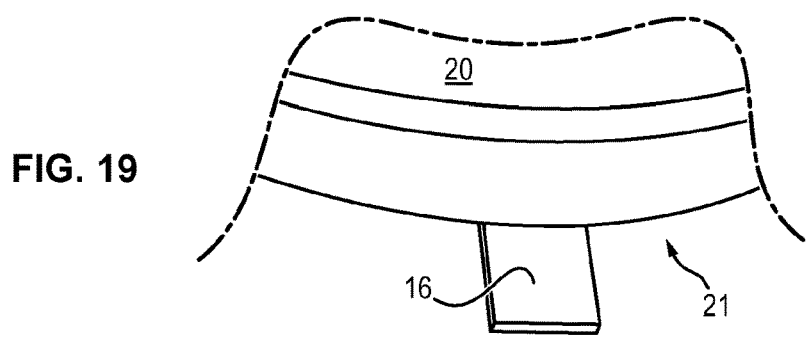

It is then sufficient to hold the key 50 in contact with the outer surface 21 of the body 20 while carrying out the operation of tightening the nut as shown schematically in FIG. 18 to guarantee correct positioning of the tab 16 with respect to the blank 21 of the body 20, as illustrated in FIG. 19.

The present invention thus makes it possible to guarantee holding of the nut 30 at the desired nominal tightening torque once the tab 16 is folded squarely at 90 degrees to the plane of the washer, parallel to the axis of the nut, along the blank 21.

A person skilled in the art will understand that the key conforming to the invention allows a secure and quick motion without complications in implementation and without consequent additional cost.

Figure 13:
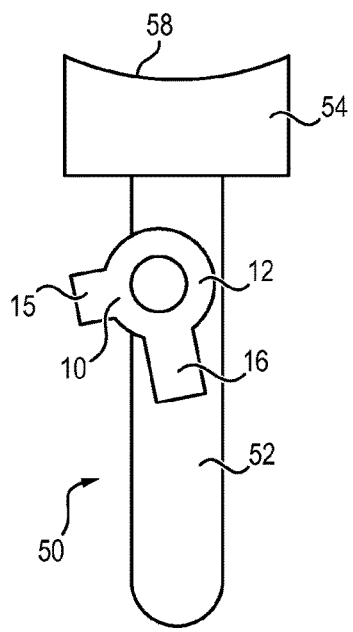
Figure 14:
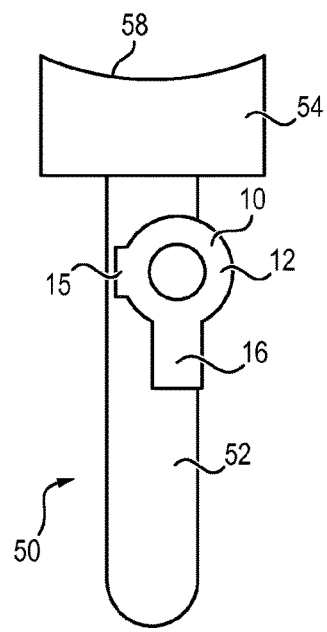
Figure 15:
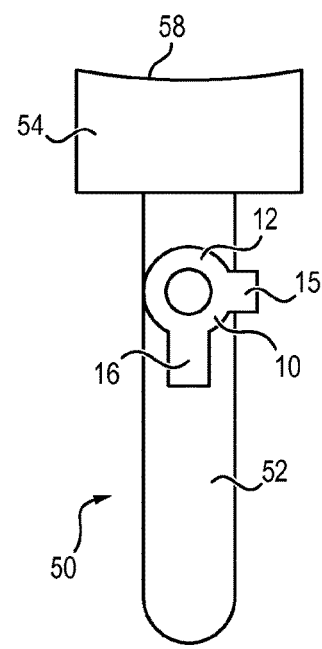

As illustrated in FIGS. 13, 14 and 15, a set of keys 50 is proposed within the scope of the invention, the recesses 56 whereof are respectively suited to the geometry and to the dimensions of the tabs 16 of the nut retainers in question.

The invention claimed is:

1. A method for holding a nut retainer during tightening of an associated nut on a threaded rod or screwed connection, wherein said nut retainer comprises a washer adapted to be engaged on a threaded rod or screwed connection, at least one radial fin intended to be folded after tightening of the associated nut on said threaded rod or screwed connection against a blank of said nut and at least one radial tab intended to be folded 90° against a portion of a body bearing the threaded connection associated with the nut, and wherein said method uses a set of keys, each key comprising a handle as well as a head including a recess complementary to the tab so that said tab of the nut retainer may be inserted into the recess, a bearing face of the head being complementary to a portion of the body bearing the threaded connection which receives the nut, planar or concave cylinder of revolution, comprising the steps of:
    selecting a key device comprising a recess of geometry and dimensions complementary to the tab of the nut retainer,
    installing the nut retainer on a threaded connection,
    orienting the at least one radial tab generally perpendicular to the outer face of the body,
    engaging a free end of the at least one radial tab in the recess,
    bringing the bearing face of the key into contact against the blank of the body bearing the threaded connection on which is engaged the associated nut retainer,
    holding the key in contact with the outer surface of the body while carrying out the operation of tightening the nut so as to hold said nut retainer in a radial position during tightening of the nut on the associated screwed connection, with respect to the blank of the body, and folding the at least one radial tab squarely at 90 degrees to the plane of the washer, parallel to the axis of the nut, along the blank of the body.

* * * * *